United States Patent Office 3,097,809
Patented July 16, 1963

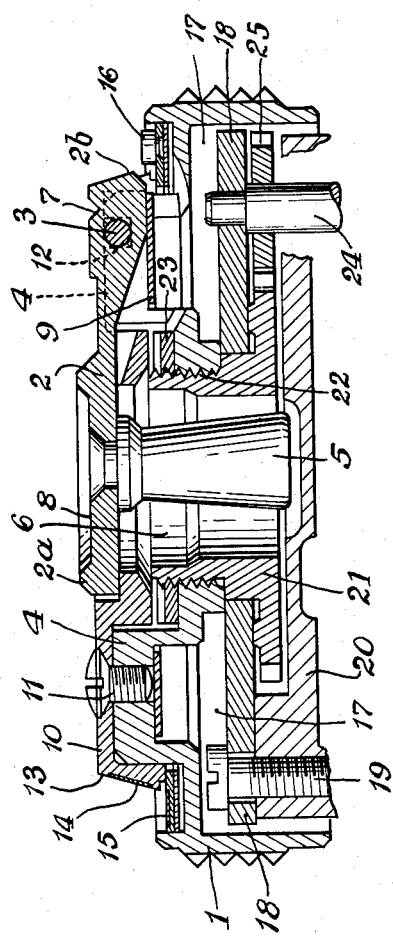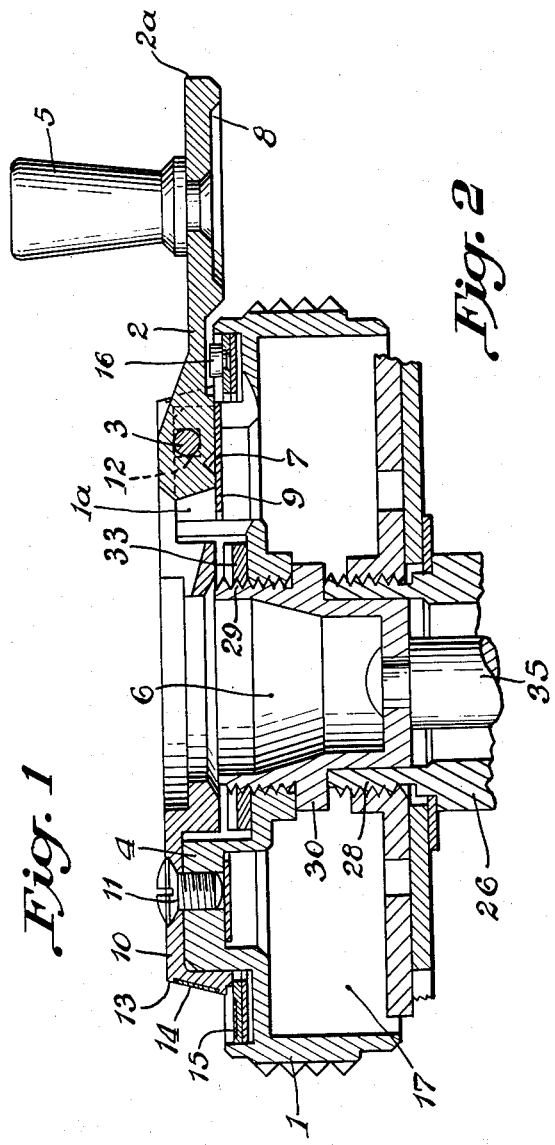

3,097,809
FILM REWIND DEVICE ON PHOTOGRAPHIC
CAMERAS
Willi Günther, Stuttgart-Mohringen, Germany, assignor to
Zeiss Ikon Aktiengesellschaft, Stuttgart S, Germany
Filed Mar. 23, 1959, Ser. No. 801,066
Claims priority, application Germany Mar. 27, 1958
2 Claims. (Cl. 242—71.3)

The invention relates to photographic cameras and particularly to a film rewinding device provided with an operating handle in the form of a tiltable crank arm.

It is an object of the present invention to arrange the operating handle for the rewinding of the film in such a manner that a handle on the tiltable crank arm in the inoperative position of the arm is positioned in a recess provided in the center of the film rewinding knob.

Such an arrangement has the advantage that the handle on the crank arm is hidden from view when the crank arm is tilted to its inoperative position even though it is attached to a conventional film re-wind-knob. It is also possible to utilize the customary cavity in the rewinding knob for accommodating therein certain gears and other instrument parts of the camera and even to provide an operative gearing connection between the rewinding knob and the film spool when the latter is mounted eccentrically relative to the film rewinding knob. Said gearing connection may include a coupling element which heretofore had to be arranged coaxially to the rewinding knob. Furthermore, the space underneath the rewinding knob can also be used, for instance, for accommodating an electric exposure meter which is inserted as a complete unit into the camera and may be operatively coupled with the exposure controlling element of the camera objective.

The drawings illustrate by way of example an embodiment of the invention.

FIG. 1 illustrates in a sectional view a film rewinding device on a camera with the tiltable operating handle in its inoperative position.

FIG. 2 shows a somewhat different film rewinding device with the operating handle in operative position.

Figure 3:
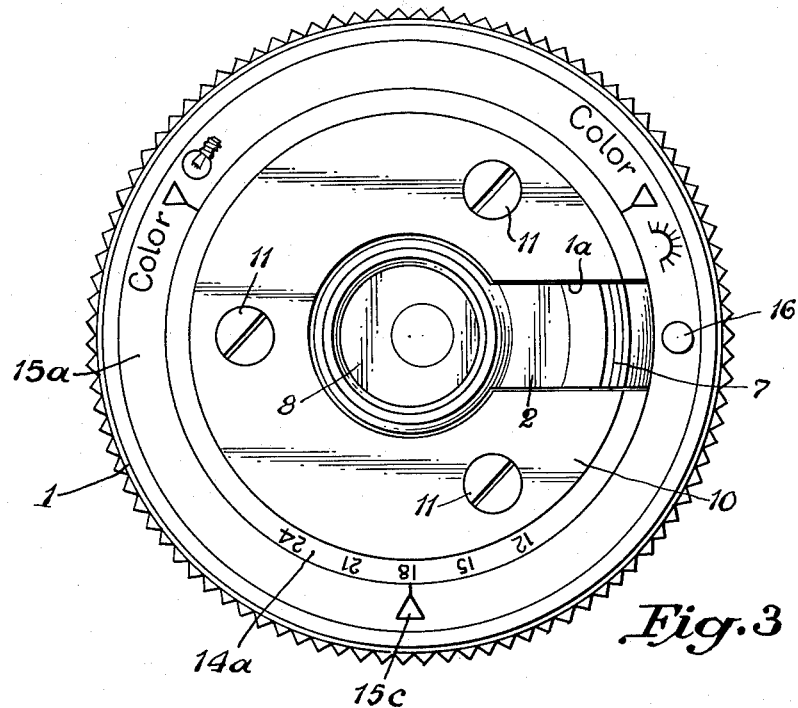
FIG. 3 shows a top plan view of a film rewinding device.

Referring to the drawings, the film rewinding device consists of a circular knob 1 provided on its upper end face with a crank-like arm 2 which is tiltable about a pivot pin 3 into and out of operative position. In its inoperative position the arm 2 lies in a slot-shaped recess 1a arranged radially in the upper portion 4 of the knob 1. The outer enlarged end 2a of the arm 2 has a handle 5 fixedly attached thereto at a right angle. This handle 5 in the inoperative position of the arm 2 lies in a centrally located opening 6 of the rewinding knob 1 as shown in FIG. 1. The tiltable arm 2 is provided on its side opposite the side on which the handle 5 is secured with a circular recess 8, which may be colored and which will be located concentric to the rotatable rewinding knob 1 when the handle 5 lies in the radial recess and covers the opening 6. An annular leaf spring 9 is placed in an annular recess of the rewinding knob 1 and is arranged to engage that end of the arm 2 which receives the pivot pin 3, when the handle is tilted outwardly into its operative position as shown in FIG. 2. A notch 7 on the tiltable arm 2 is used to facilitate a lifting of the arm 2 from its inoperative to its operative position. Furthermore, the cooperation of the spring 9 with the prismatically bevelled end 2b of the arm 2 will assure a releasable locking of the arm 2 in its two end positions.

A cover plate 10 is attached by screws 11 to the upper face of the rewinding knob 1, but does not cover the crank arm 2. This cover plate is, however, also used for securing the pivot pin 3 of the arm 2 in position. This pivot pin 3 is disposed in a groove 12 provided in the upper portion 4 of the knob 1. A scale ring 14 is secured on a bevelled circumferential surface 13 of the cover plate 10. This scale ring 14 cooperates with a second rotatably adjustable scale ring 15. The scale ring 15 which is yieldably supported in an annular recess of the knob 1 extends concentrically around the scale ring 14 and can be moved relatively to the scale ring 14 by a button 16.

The rewinding knob 1 is provided on its lower face with a cavity or recess 17 into which extend certain gears and instrument parts of the camera. In the embodiment of the invention shown in FIG. 1, the recess 17 accommodates a plate 18 which is fixedly secured by means of screws 19 to the housing 20 of an exposure meter or the like. A gear 21 is rotatably supported in a base in the center of said plate 18. This gear 21 is fixedly connected to the rewinding knob 1 by a thread 22 provided on the hub of the gear. This threaded connection is locked by a lock nut 23. The plate 18 also supports one end of a shaft 24 on which a gear 25 is mounted which meshes with the gear 21. The rotative movement of the rewinding knob 1 is transmitted by the gears 21 and 25 to the shaft 24 which in turn transmits its rotation to a coupling member connected with the film spool on which the film is to be rewound. The film spool is arranged in a suitable place in the camera. This arrangement of the gears makes it possible to accommodate an electric exposure meter or other elements directly underneath the rewinding knob 1 in the upper part of the camera.

FIG. 2 illustrates a modified arrangement of the film rewinding device in which the rewinding knob 1 is connected with a shaft 35 which is arranged in axial alignment with the knob 1 and extends through the upper part of the camera. The shaft 35 connects the rewinding knob 1 with a coupling member (not shown) for the film spool and extends through a sleeve 26 which is fixedly mounted in the camera casing. The upper end of the sleeve 26 which is threaded into a wall of the camera casing is used as a bearing 28 for an intermediate tubular member 30 which is attached to the upper end of the shaft 35 and also to the rewinding knob by a thread 29. A firm connection between the tubular member 30 and the rewinding knob 1 is assured by a lock-nut 33. In other respect, the construction of the rewinding device is the same as shown in FIG. 1.

FIG. 3 is a top plan view of a rewinding device in which a scale ring 14a fixedly attached to the bevelled surface 13 of the cover plate 10 is provided with numbers indicating film speed values, such as 12, 15, 18, 21 and 24. A rotatably adjustable annular scale ring 15a concentrically surrounding said scale ring 14 is provided with an index mark 15c and with different symbols indicating the different types of films which may be used. These symbols may be adjusted to the respective values of the speed of the film placed in the camera. These two scale rings are thus used for indicating the film speed and the type of the film used.

Figure 4:
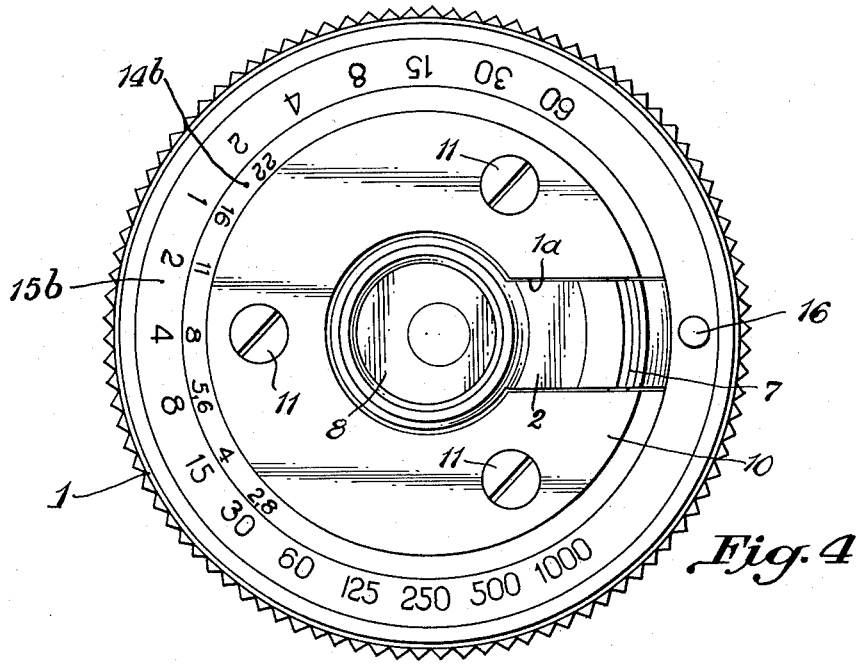
FIG. 4 shows a top plan view of another film rewinding device.

According to another embodiment illustrated in FIG. 4 the rewinding knob is provided with two scale rings 14b and 15b which indicate the diaphragm aperture and the shutter speed respectively, to which the camera has been adjusted. For this purpose the rotatably adjustable scale ring 15b is provided with numbers indicating shutter speeds which can be brought into a certain position with respect to a diaphragm aperture scale arranged on the scale ring 14b fixedly attached to the knob in accordance with a previously determined light value. It should be observed that the scale rings 14b and 15b are not operatively coupled with the adjusting members of the camera which control the adjustment of the shutter speed and the diaphragm aperture.

What I claim is:

1. In a film rewinding device for a photographic camera, a circular rewinding knob having a radial slot extending from a central recess, an arm pivotally mounted by means of its ends on the outer end face of said knob about an axis located between the center of said knob and its circumference, the free end of said arm being enlarged to form a cover for said recess, a handle extending at right angles from the enlarged end of said arm, said knob having a central cavity adapted to receive said handle when said arm is tilted about said axis from its operative position in which said enlarged end of said arm extends beyond the circumference of said knob to its inoperative position in which said enlarged end of said arm covers said central recess, means including spring means for releasably locking said arm in its operative and in its inoperative positions, said arm when tilted into its operative position forming a crank for rotating said rewinding knob, and gear members positioned in said cavity for operatively connecting said knob with an eccentrically mounted shaft in the camera, which shaft is coupled with the film spool upon which film is to be rewound.

2. In a film rewinding device for a photographic camera, a circular rewinding knob, an arm pivotally mounted by means of one of its ends on the outer end face of said knob about an axis located between the center of said knob and its circumference, a handle extending at right angles from the other end of said arm, said knob having a central recess adapted to receive said handle when said arm is tilted about said axis from its operative position in which said other end of said arm extends beyond the circumference of said knob to its inoperative position in which said other end of said arm covers said central recess, and means including spring means for releasably locking said arm in its operative and in its inoperative positions, said arm when tilted into its operative position forming a crank for rotating said rewinding knob, the lower portion of said rewinding knob being provided with a cavity, and gear members being positioned in said cavity for operatively connecting said knob with an operative shaft in the camera, which shaft is coupled with the film spool upon which film is to be rewound and is eccentrically mounted to the axis of the rewinding knob.

References Cited in the file of this patent

UNITED STATES PATENTS

| | | |
|---|---|---|
| 338,602 | Keuffel | Mar. 23, 1886 |
| 498,104 | Buck | May 23, 1893 |
| 2,346,615 | Santon | Apr. 11, 1944 |
| 2,893,656 | Carlson | July 7, 1959 |
| 3,005,599 | Padelt | Oct. 24, 1961 |

FOREIGN PATENTS

| | | |
|---|---|---|
| 284,478 | Germany | May 28, 1915 |